United States Patent
Agiwal et al.

(10) Patent No.: US 11,979,918 B2
(45) Date of Patent: May 7, 2024

(54) METHOD AND APPARATUS FOR BWP SWITCHING AND PUSCH RESOURCE OVERHEAD REDUCING FOR 2 STEP RACH IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 366 days.

(21) Appl. No.: 17/310,488

(22) PCT Filed: Feb. 7, 2020

(86) PCT No.: PCT/KR2020/001760
§ 371 (c)(1),
(2) Date: Aug. 5, 2021

(87) PCT Pub. No.: WO2020/166891
PCT Pub. Date: Aug. 20, 2020

(65) Prior Publication Data
US 2022/0132591 A1 Apr. 28, 2022

Related U.S. Application Data

(60) Provisional application No. 62/804,368, filed on Feb. 12, 2019.

(30) Foreign Application Priority Data

Feb. 7, 2020 (KR) .................. 10-2020-0014742

(51) Int. Cl.
*H04W 74/08* (2009.01)
*H04W 72/02* (2009.01)
(Continued)

(52) U.S. Cl.
CPC ....... *H04W 74/0841* (2013.01); *H04W 72/02* (2013.01); *H04W 72/044* (2013.01); *H04W 74/0866* (2013.01)

(58) Field of Classification Search
CPC ......... H04W 74/0841; H04W 74/0833; H04W 74/085; H04W 72/02; H04W 72/04; H04W 72/044; H04W 72/0457; H04W 72/40
See application file for complete search history.

(56) References Cited

U.S. PATENT DOCUMENTS 10,856,239 B2 * 12/2020 Jeon .................. H04W 52/36
11,057,940 B2 7/2021 Agiwal et al.
(Continued)

FOREIGN PATENT DOCUMENTS

WO 2018/132843 A1 7/2018
WO 2018/232090 A1 12/2018
(Continued)

OTHER PUBLICATIONS

OPPO, "BWP switching due to LBT", 3GPP TSG-RAN WG2 Meeting #103bis, Oct. 8-12, 2018, R2-1813589, 2 pages.
(Continued)

*Primary Examiner* — Phong La

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides method and appa-
(Continued)

ratus for BWP switching and PUSCH resource overhead reducing for 2 step RACH.

15 Claims, 7 Drawing Sheets

(51) Int. Cl.
  *H04W 72/04* (2023.01)
  *H04W 72/044* (2023.01)
  *H04W 74/0833* (2024.01)

(56) References Cited

U.S. PATENT DOCUMENTS

| | | | |
|---|---|---|---|
| 2018/0205516 A1 | 7/2018 | Jung et al. | |
| 2018/0279186 A1* | 9/2018 | Park | H04W 36/30 |
| 2019/0306867 A1* | 10/2019 | Cirik | H04B 7/0639 |
| 2019/0335506 A1 | 10/2019 | Agiwal et al. | |
| 2019/0335507 A1 | 10/2019 | Agiwal et al. | |
| 2020/0107277 A1* | 4/2020 | Jeon | H04W 52/228 |
| 2021/0168862 A1* | 6/2021 | Murray | H04W 74/002 |
| 2021/0227587 A1* | 7/2021 | Tsai | H04W 56/0045 |

FOREIGN PATENT DOCUMENTS

| | | | | |
|---|---|---|---|---|
| WO | WO-2019083277 A1 * | 5/2019 | | H04W 72/04 |
| WO | WO-2021064706 A1 * | 4/2021 | | H04L 5/0053 |

OTHER PUBLICATIONS

Intel Corporation, "Enhancements to initial access and mobility for NR-unlicensed", 3GPP TSG RAN WG1 Meeting #95, Nov. 12-16, 2018, R1-1812483, 6 pages.

"3rd Generation Partnership Project; Technical Specification Group Radio Access Network; NR; Medium Access Control (MAC) protocol specification (Release 15)", 3GPP TS 38.321 V15.3.0 (Sep. 2018), 76 pages.

International Search Report dated May 14, 2020 in connection with International Patent Application No. PCT/KR2020/001760, 3 pages.

European Patent Office, "Supplementary European Search Report" dated Dec. 7, 2021, in connection with European Patent Application No. 20755351.2, 8 pages.

Qualcomm Incorporated, "BWP configuration during handover", 3GPP TSG-RAN WG2 Meeting #100, R2-1801270, Vancouver, Canada, Jan. 22-26, 2018, 4 pages.

Sony, "Considerations on initial access and mobility for NR unlicensed operations", 3GPP TSG RAN WG1 Meeting #94, R1-1808336, Gothenburg, Sweden, Aug. 20-24, 2018, 5 pages.

* cited by examiner

[Fig. 1]
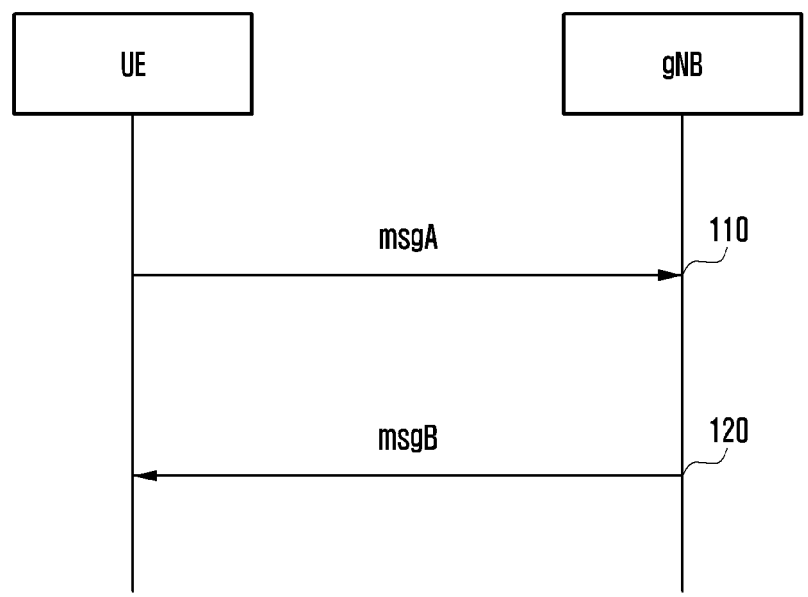

[Fig. 2]
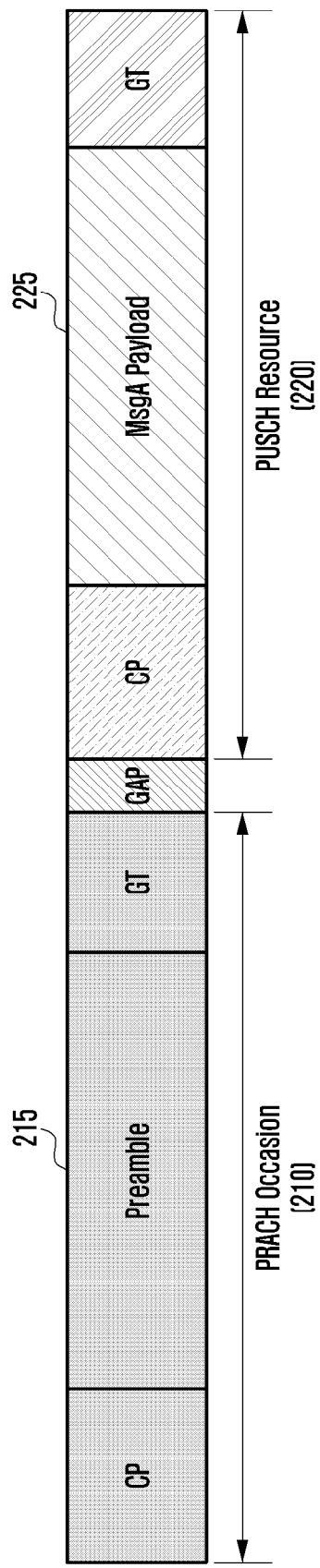

[Fig. 3]
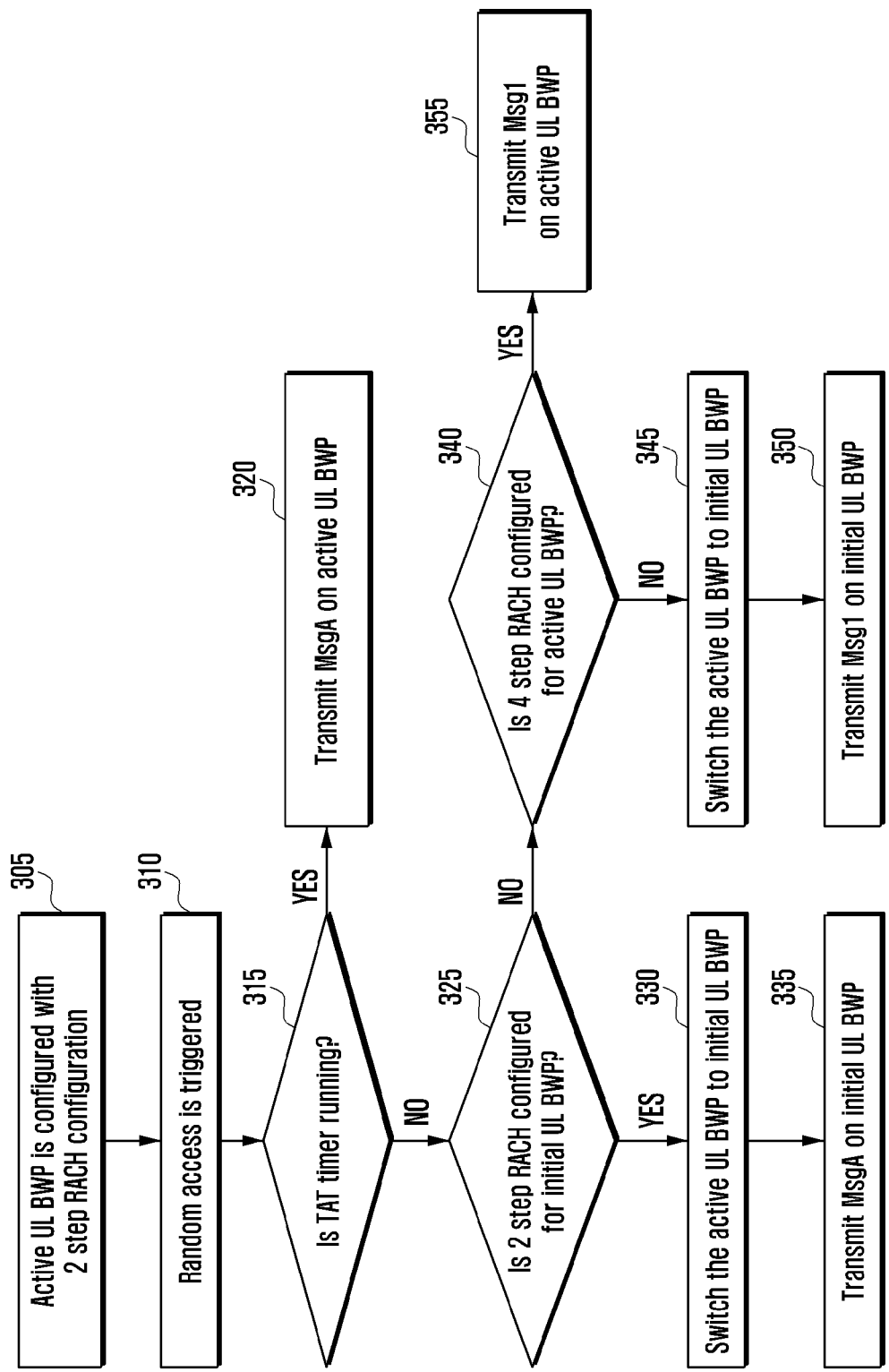

[Fig. 4]
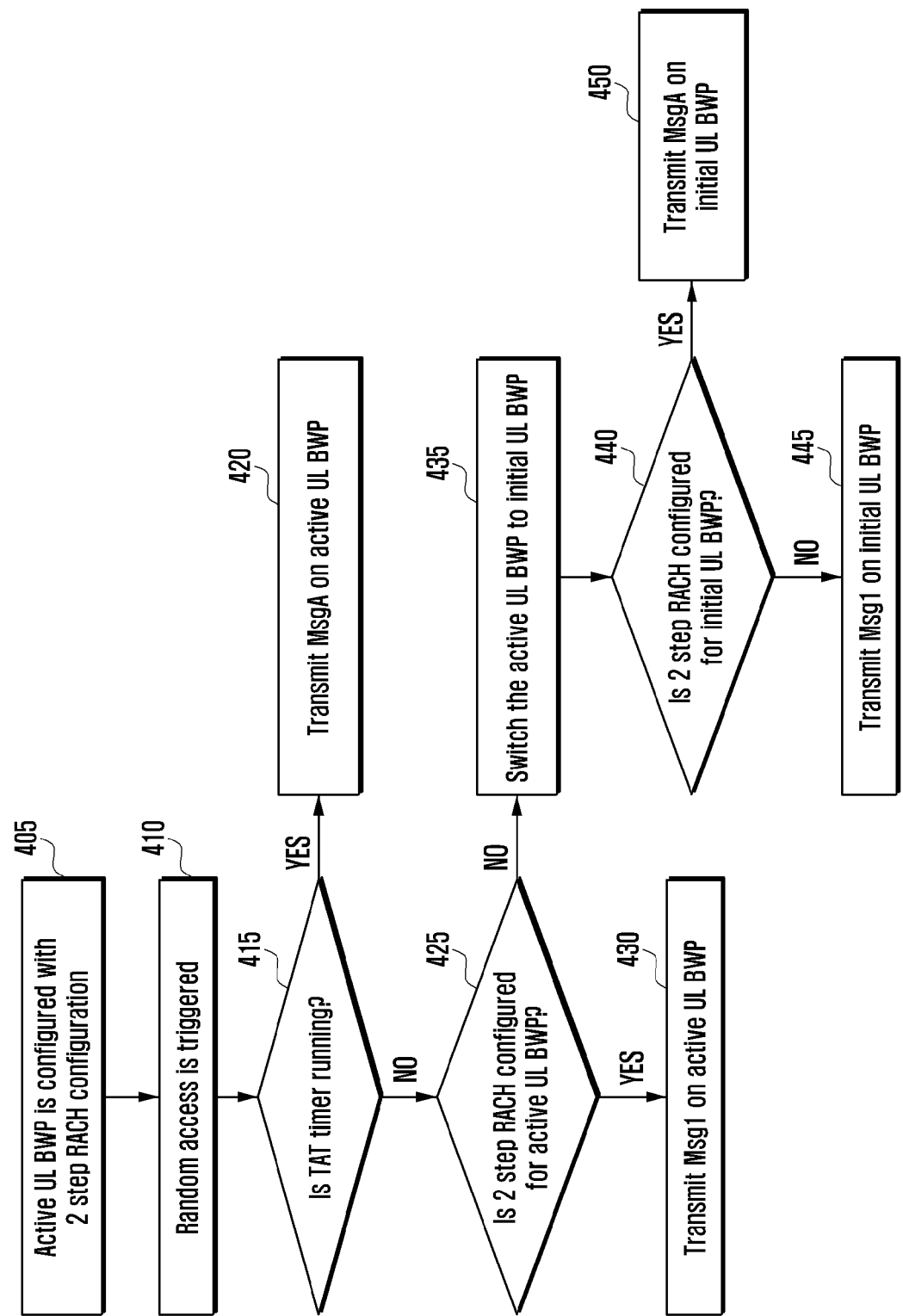

[Fig. 5]
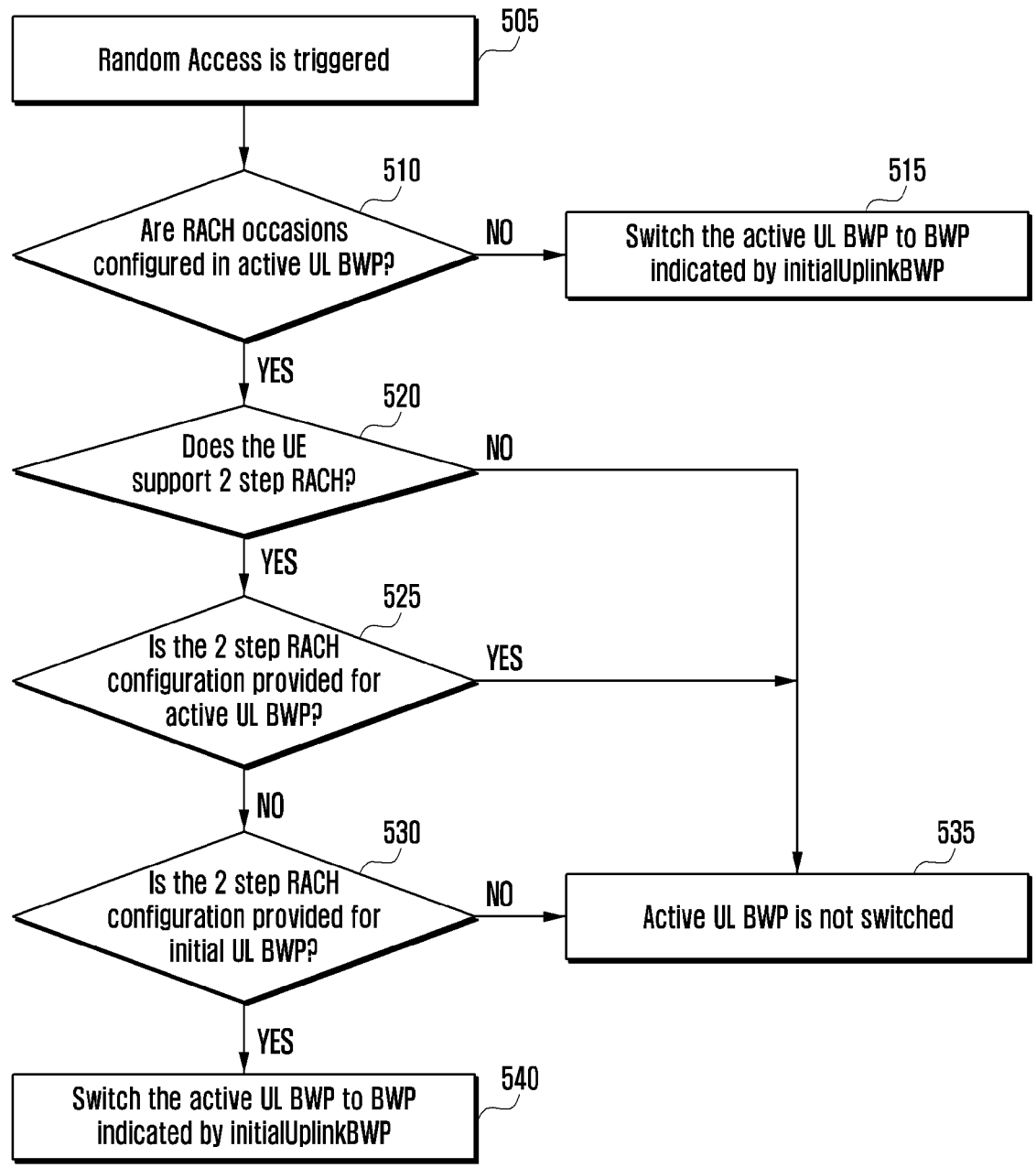

[Fig. 6]
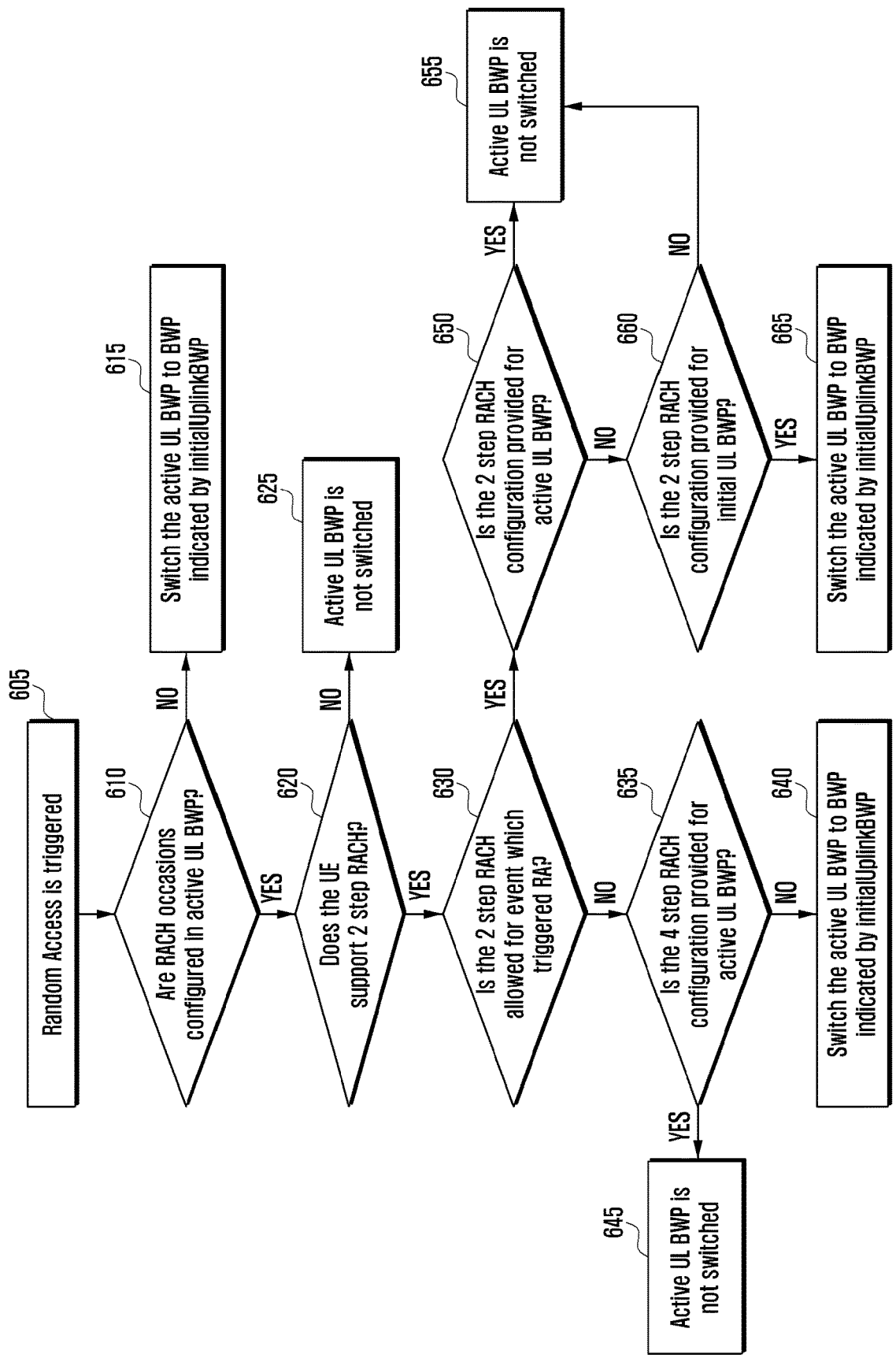

[Fig. 7]
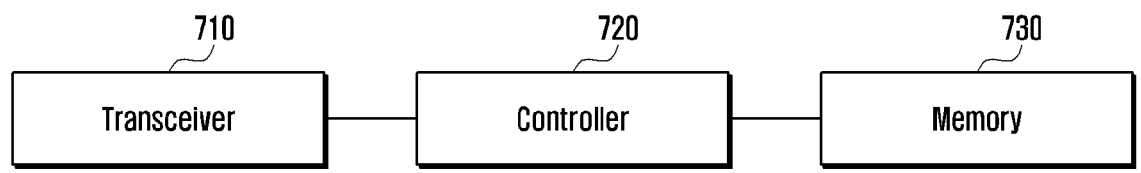
[Fig. 8]
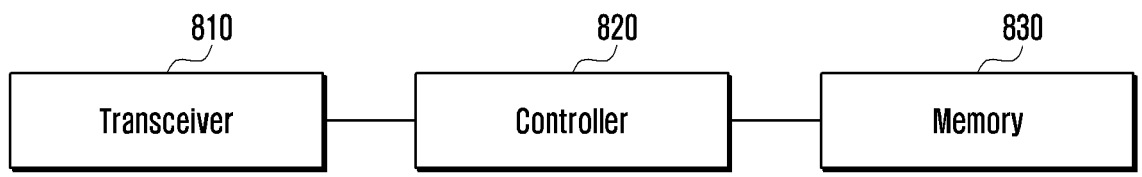

METHOD AND APPARATUS FOR BWP SWITCHING AND PUSCH RESOURCE OVERHEAD REDUCING FOR 2 STEP RACH IN WIRELESS COMMUNICATION SYSTEM

CROSS-REFERENCE TO RELATED APPLICATIONS

This application is a 371 of International Application No. PCT/KR2020/001760 filed on Feb. 7, 2020, which claims priority to U.S. Patent Application No. 62/804,368 filed on Feb. 12, 2019 and Korean Patent Application No. 10-2020-0014742 filed on Feb. 7, 2020, the disclosures of which are herein incorporated by reference in their entirety.

BACKGROUND

1. Field

The disclosure relates to a wireless communication system. Specifically, the disclosure relates to an apparatus, a method and a system for bandwidth part (BWP) switching and physical uplink shared channel (PUSCH) resource overhead reducing for 2-step random access channel (RACH) in wireless communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, there are needs to enhance 2 step random access procedure (or, 2 step RACH) in next generation wireless communication system.

There are needs to enhance 2 step random access procedure (or, 2 step RACH) in next generation wireless communication system.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G).

In accordance with an aspect of the disclosure, a method performed by a terminal comprises: identifying whether an active uplink bandwidth part (BWP) is configured with a physical random access channel (PRACH) occasion, upon triggering of a random access procedure on a serving cell; identifying whether the active uplink BWP is configured with a 2-step random access channel (RACH) configuration, in case that active uplink BWP is configured with the PRACH occasion and the terminal supports a 2-step random access procedure; switching to an initial uplink BWP, in case that the active uplink BWP is not configured with the 2-step RACH configuration; and performing the 2-step random access procedure in the initial uplink BWP.

In accordance with another aspect of the disclosure, a method performed by a base station comprises: transmitting, to a terminal, information configuring a physical random access channel (PRACH) occasion; and transmitting, to the terminal, information configuring a 2-step random access configuration, wherein whether an active uplink bandwidth part (BWP) is configured with a PRACH occasion is identified by the terminal, upon triggering of a random access procedure on a serving cell, wherein whether the active uplink BWP is configured with a 2-step RACH configuration is identified by the terminal, in case that active uplink BWP is configured with the PRACH occasion and the terminal supports a 2-step random access procedure, wherein the active uplink BWP is switched to an initial uplink BWP by the terminal, in case that the active uplink BWP is not configured with the 2-step RACH configuration, and wherein the 2-step random access procedure is performed by the terminal in the initial uplink BWP.

In accordance with another aspect of the disclosure, a terminal comprises: a transceiver configured to transmit and receive a signal; and a controller configured to: identify whether an active uplink bandwidth part (BWP) is configured with a physical random access channel (PRACH) occasion, upon triggering of a random access procedure on a serving cell, identify whether the active uplink BWP is configured with a 2-step random access channel (RACH) configuration, in case that active uplink BWP is configured with the PRACH occasion and the terminal supports a 2-step random access procedure, switch to an initial uplink BWP, in case that the active uplink BWP is not configured with the 2-step RACH configuration, and perform the 2-step random access procedure in the initial uplink BWP.

In accordance with another aspect of the disclosure, a base station comprises: a transceiver configured to transmit and receive a signal; and a controller configured to: transmit, to a terminal, information configuring a physical random access channel (PRACH) occasion, and transmit, to the terminal, information configuring a 2-step random access configuration, wherein whether an active uplink bandwidth part (BWP) is configured with a PRACH occasion is identified by the terminal, upon triggering of a random access procedure on a serving cell, wherein whether the active uplink BWP is configured with a 2-step RACH configuration is identified by the terminal, in case that active uplink BWP is configured with the PRACH occasion and the terminal supports a 2-step random access procedure, wherein the active uplink BWP is switched to an initial uplink BWP by the terminal, in case that the active uplink BWP is not configured with the 2-step RACH configuration, and wherein the 2-step random access procedure is performed by the terminal in the initial uplink BWP.

In accordance with various embodiments of the disclosure, 2 step random access procedure in next generation wireless communication system can be efficiently enhanced.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 illustrates an example of a 2-step random access procedure according to the disclosure;

FIG. 2 illustrates an example of message A (msgA) in 2-step random access procedure;

FIG. 3 illustrates a 2-step random access procedure according to an embodiment of the disclosure;

FIG. 4 illustrates a 2-step random access procedure according to another embodiment of the disclosure;

FIG. 5 illustrates a 2-step random access procedure according to another embodiment of the disclosure;

FIG. 6 illustrates a 2-step random access procedure according to another embodiment of the disclosure;

FIG. 7 is a block diagram of a terminal according to an embodiment of the disclosure; and FIG. 8 is a block diagram of a base station according to an embodiment of the disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), 5G NB (5GNB), or gNB.

The "UE" is an entity communicating with a BS and may be referred to as UE, device, mobile station (MS), mobile equipment (ME), or terminal.

In the recent years several broadband wireless technologies have been developed to meet the growing number of broadband subscribers and to provide more and better applications and services. The $2^{nd}$ generation wireless communication system has been developed to provide voice services while ensuring the mobility of users. $3^{rd}$ generation wireless communication system supports not only the voice service but also data service. In recent years, the $4^{th}$ wireless communication system has been developed to provide high-speed data service. However, currently, the $4^{th}$ generation wireless communication system suffers from lack of resources to meet the growing demand for high speed data services. So $5^{th}$ generation wireless communication system is being developed to meet the growing demand for high speed data services, support ultra-reliability and low latency applications.

The $5^{th}$ generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the $5^{th}$ generation wireless communication system is expected to address different use cases having quite different requirements in terms of data rate, latency, reliability, mobility etc. However, it is expected that the design of the air-interface of the $5^{th}$ generation wireless communication system would be flexible enough to serve the UEs having quite different capabilities depending on the use case and market segment the UE cater service to the end customer. Few example use cases the $5^{th}$ generation wireless communication system wireless system is expected to address is enhanced Mobile Broadband (eMBB), massive Machine Type Communication (m-MTC), ultra-reliable low latency communication (URLLC) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the $5^{th}$ generation wireless communication system operating in higher frequency (mmWave) bands, UE and gNB communicates with each other using Beamforming. Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end.

In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming. A receiver can also make plurality of receive (RX) beam patterns of different directions. Each of these receive patterns can be also referred as receive (RX) beam.

The $5^{th}$ generation wireless communication system, supports standalone mode of operation as well dual connectivity (DC). In DC a multiple Rx/Tx UE may be configured to utilise resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in radio resource control connected state (or, RRC_CONNECTED state) is configured to utilise radio resources provided by two distinct schedulers, located in two different nodes connected via a non-ideal backhaul and providing either E-UTRA (Evolved Universal Mobile Telecommunications System (UMTS) Terrestrial Radio Access) (i.e. if the node is an ng-eNB) or NR access (i.e. if the node is a gNB). In NR for a UE in RRC_CONNECTED not configured with CA (carrier aggregation)/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more SCells. In NR PCell (primary cell) refers to a serving cell in MCG, operating on the primary frequency, in which the UE either performs the initial connection establishment procedure or initiates the connection re-establishment procedure. In NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the 5$^{th}$ generation wireless communication system, node B (gNB) or base station in cell broadcast Synchronization Signal and Physical Broadcast Channel (PBCH) block (SSB) consists of primary synchronization signal (PSS) and secondary synchronization signal (SSS) and system information. System information includes common parameters needed to communicate in cell. In the fifth generation wireless communication system (also referred as next generation radio or NR), System Information (SI) is divided into the master information block (MIB) and a number of system information blocks (SIBs) where:

the MIB is always transmitted on the PBCH with a periodicity of 80 ms and repetitions made within 80 ms and it includes parameters that are needed to acquire SIB1 from the cell.

the SIB1 is transmitted on the downlink shared channel (DL-SCH) with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the 5$^{th}$ generation wireless communication system, Physical Downlink Control Channel (PDCCH) is used to schedule downlink (DL) transmissions on Physical Downlink Shared Channel (PDSCH) and uplink (UL) transmissions on Physical Uplink Shared Channel (PUSCH), where the Downlink Control Information (DCI) on PDCCH includes: Downlink assignments containing at least modulation and coding format, resource allocation, and hybrid automatic repeat request (HARD) information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the physical resource block(s) (PRB(s)) and orthogonal frequency division multiplexing (OFDM) symbol(s) where the UE may assume no transmission is intended for the UE; Transmission of transmission power control (TPC) commands for Physical Uplink Control Channel (PUCCH) and PUSCH; Transmission of one or more TPC commands for sounding reference signal (SRS) transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own demodulation reference signal (DMRS). Quadrature phase shift keying (QPSK) modulation is used for PDCCH.

In 5$^{th}$ generation wireless communication system, a list of search space configurations are signaled by GNB for each configured bandwidth part (BWP) wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation 1 below:

$$(y * (\text{number of slots in a radio frame}) + \qquad [\text{equation 1}]$$
$$x - \text{Monitoring-offset-}PDCCH\text{-slot})$$
$$\text{mod } (\text{Monitoring-periodicity-}PDCCH\text{-slot}) = 0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. Search space configuration includes the identifier of CORESET configuration associated with it. A list of CORESET configurations is signalled by GNB for each configured BWP wherein each CORESET configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each CORESET configuration is associated with a list of TCI (Transmission configuration indicator) states. One DL RS ID (SSB or CSI RS) is configured per TCI state. The list of TCI states corresponding to a CORESET configuration is signalled by gNB via RRC signalling. One of the TCI state in TCI state list is activated and indicated to UE by gNB. TCI state indicates the DL TX beam (DL TX beam is quasi-collocated (QCLed) with SSB/CSI RS of TCI state) used by GNB for transmission of PDCCH in the PDCCH monitoring occasions of a search space.

In NR bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services).

A subset of the total cell bandwidth of a cell is referred to as a Bandwidth Part (BWP) and BA is achieved by configuring the UE with BWP(s) and telling the UE which of the configured BWPs is currently active. When BA is configured, the UE only has to monitor PDCCH on the one active BWP i.e. it does not have to monitor PDCCH on the entire DL frequency of the serving cell. A serving cell is configured with one or more BWPs, and for a serving cell, there is one active BWP at any point in time. The BWP switching for a serving cell is used to activate an inactive BWP and deactivate an active BWP at a time. The BWP switching is controlled by the PDCCH indicating a downlink assignment or an uplink grant, or by RRC signaling. Additionally, a BWP inactivity timer is used to switch the active DL BWP to the default DL BWP or initial DL BWP of a serving cell. One of the configured BWPs of a serving cell can be a default DL BWP and is indicated in BWP configuration received from gNB. Initial DL BWP is also signaled (either in system information or in dedicated signaling). One of the configured BWPs of a serving cell can be an first active DL BWP and is indicated in BWP configuration received from gNB. It is to be noted that BWP inactivity timer may or may not be configured in BWP configuration of each serving cell received from gNB. BWP inactivity timer if configured, is signaled independently for each serving cell. None or multiple serving cells may be configured with BWP inactivity timer. In NR upon expiry of BWP inactivity timer, active DL BWP is switched to default DL BWP.

Upon initiation of the Random Access procedure on a Serving Cell, if PRACH occasions are not configured for the active UL BWP of this serving cell: UE switches the active UL BWP to BWP indicated by initialUplinkBWP; If this Serving Cell is a SpCell, UE also switches the active DL BWP to BWP indicated by initialDownlinkBWP. Upon initiation of the Random Access procedure on a Serving Cell, if PRACH occasions are configured for the active UL BWP of this serving cell: if this Serving Cell is a SpCell and if the active DL BWP of this serving cell does not have the same bwp-Id as the active UL BWP of this serving cell, UE switches the active DL BWP to the DL BWP with the same bwp-Id as the active UL BWP.

In the $5^{th}$ generation (also referred as NR or New Radio) wireless communication system, random access (RA) procedure is used to achieve uplink time synchronization. RA procedure is used during initial access, handover, RRC connection re-establishment procedure, scheduling request transmission, SCG addition/modification and data or control information transmission in uplink by non-synchronized UE in RRC CONNECTED state.

4 step Contention based random access (CBRA): During the RA procedure (which comprise of 4 steps), UE first transmits Random Access Preamble (also referred as Msg1) and then waits for Random Access Response (RAR) or Msg2 in the RAR window corresponding to its Random Access Preamble transmission. GNB transmits the RAR on PDSCH addressed to RA radio network temporary identifier (RA-RNTI). Several RARs for various Random Access Preambles detected by gNB can be multiplexed in the same RAR medium access control (MAC) protocol data unit (PDU) by gNB. An RAR in MAC PDU corresponds to UE's Random Access Preamble transmission if it includes random access preamble identifier (RAPID) of Random Access Preamble transmitted by it. If the RAR corresponding to its Random Access Preamble transmission is not received during the RAR window and UE has not yet transmitted the Random Access Preamble for a configurable (configured by gNB in RACH configuration) number of times, UE retransmits the Random Access Preamble. If the RAR corresponding to its Random Access Preamble transmission is received and UE has transmitted a dedicated Random Access Preamble, RA procedure is considered successful.

If the UE has transmitted a non-dedicated (i.e. contention based) Random Access Preamble then upon successful reception of RAR, UE transmits Msg3 in UL grant received in RAR. Msg3 includes message such as RRC Connection Request, RRC Connection Re-establishment request, RRC handover confirm, scheduling request, etc. It also includes the UE identity (i.e. cell RNTI (C-RNTI) or Serving Temporary Mobile Subscriber Identity (S-TMSI) or a random number). After transmitting the Msg3, UE starts a contention resolution timer. While the contention resolution timer is running, if UE receives a PDCCH addressed to C-RNTI included in Msg3, contention resolution is considered successful, contention resolution timer is stopped and RA procedure is completed. While the contention resolution timer is running, if UE receives contention resolution MAC CE including the UE's Contention Resolution Identity (first X bits of common control channel (CCCH) service data unit (SDU) transmitted in Msg3), contention resolution is considered successful, contention resolution timer is stopped and RA procedure is completed. If the contention resolution timer expires and UE has not yet transmitted the Random Access Preamble for a configurable number of times, UE retransmits the Random Access Preamble.

Contention free random access (CFRA): In the $5^{th}$ generation (also referred as NR or New Radio) wireless communication system, Contention-free RA (CFRA) Procedure is also supported. Contention free RA procedure is used for scenarios such as handover where low latency is required, timing advance establishment for Scell, etc. ENB or gNB assigns to UE non-contention RA preamble in dedicated signaling. UE transmits the assigned non-contention RA preamble. ENB or gNB transmits the RAR on PDSCH addressed to RA-RNTI. RAR conveys RA preamble identifier and Timing alignment information. RAR may also include UL grant. RAR is transmitted in RAR window similar to contention based RA procedure. Contention free RA procedure terminates after receiving the RAR.

2 step contention based random access (2 step CBRA): FIG. 1 illustrates an example of a 2-step random access procedure according to the disclosure. In the first step, UE transmits random access preamble on PRACH and a payload (i.e. MAC PDU) on PUSCH (110). The random access preamble and payload transmission is also referred as MsgA. PRACH Preamble and PUSCH in a msgA is time division multiplexed (TDMed). An example structure is shown in Figure FIG. 2. In the second step, after MsgA transmission, the UE monitors for a response from the network (i.e. gNB) (120). The response is also referred as message B (or, MsgB). MsgB is addressed to MSGB-RNTI, where MSGB-RNTI is defined as following equation 2.

$$MSGB\text{-}RNTI = 1 + s\_id + 14*t\_id + 14*80*f\_id + \\ 14*80*8*ul\_carrier\_id + 14*80*8*2$$ [equation 2]

where

In equation 2, where s_id is the index of the first OFDM symbol of the PRACH occasion where UE has transmitted PRACH preamble; 0≤s_id<14,
- t_id is the index of the first slot of the PRACH occasion (0≤t_id<80),
- f_id is the index of the PRACH occasion within the slot in the frequency domain (0≤f_id<8),
- ul_carrier_id is the UL carrier used for Msg1 transmission (0 for NUL (normal uplink carrier) and 1 for SUL (supplementary carrier).

If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If the window in which UE monitor network response after transmitting MsgA expires and UE has not received MsgB including contention resolution information or fallback information as explained above, UE transmits MsgA. If the random access procedure is not successfully completed even after transmitting the MsgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, synchronization signal block (SSB) information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included in MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition control information can be sent in MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/ transmission and reception point (TRP) switching indication, connection re-establishment indication, reconfiguration complete or handover complete message, etc.

2 step contention free random access (2 step CFRA): In this case gNB assigns to UE dedicated Random access preamble(s) and PUSCH resource(s) for MsgA transmission. RACH occasion(s) (RO(s)) to be used for preamble transmission may also be indicated. In the first step, UE transmits random access preamble (215) on PRACH (210) and a payload (225) on PUSCH (220) using the contention free random access resources (i.e. dedicated preamble/ PUSCH resource/RO). In the second step, after MsgA transmission, the UE monitors for a response from the network (i.e. gNB) within a configured window.

Issue 1: The duration of cyclic prefix (CP) is equal to 'Maximum delay spread+maximum round trip delay (RTD)'. The guard time (GT) is equal to max RTD (~up to 715.63 us). In 2 step RACH, maximum RTD needs to be considered as MsgA transmission is based on DL timing. Large GT and large CP size can waste lots of PUSCH resources. So some method of reducing PUSCH overhead is needed.

Issue 2: In NR, if PRACH occasions are not configured in active UL BWP: UE switches active UL BWP to initial UL BWP; Msg1 and Msg3 are transmitted on initial UL BWP. Otherwise, Msg1 and Msg3 are transmitted on active UL BWP. When 2 step RACH is supported, an UL BWP can be configured with 2 step RACH configuration or 4 step RACH configuration or both or none as shown in Table 1 below. Current operation of only checking presence or absence of RACH occasions in an UL BWP is not efficient as in some cases UE cannot perform 2 step RACH even if it is supported by both UE and network.

TABLE 1

| RACH configuration provided by network for Active UL BWP | RACH configuration provided by network for Initial UL BWP | Operation of UE which supports 2 step RACH (as per current rule) |
| --- | --- | --- |
| 2 step RACH only | 4 step RACH only | Active UL BWP is not switched |
| 2 step RACH only | Both 2 step and 4 step | Active UL BWP is not switched |
| 4 step RACH only | 4 step RACH only | Active UL BWP is not switched |

TABLE 1-continued

| RACH configuration provided by network for Active UL BWP | RACH configuration provided by network for Initial UL BWP | Operation of UE which supports 2 step RACH (as per current rule) |
|---|---|---|
| 4 step RACH only | Both 2 step and 4 step | Active UL BWP is not switched |
| Both 2 step and 4 step | 4 step RACH only | Active UL BWP is not switched |
| Both 2 step and 4 step | Both 2 step and 4 step | Active UL BWP is not switched |
| None | 4 step RACH only | Active UL BWP is switched to initial UL BWP |
| None | Both 2 step and 4 step | Active UL BWP is switched to initial UL BWP |

Hereinafter, various embodiments for resolving the above mentioned issues will be described.

Overhead Reduction of MsgA PUSCH

FIG. 3 illustrates a 2-step random access procedure according to an embodiment of the disclosure.

Method 1-1:

To reduce the PUSCH overhead, it is proposed that for 2 step RACH configuration in initial UL BWP:
  gNB configures PUSCH resource wherein GT is included
  PUSCH resource: CP+Payload+GT
In the 2 step RACH configuration in non-initial UL BWP:
  gNB configures PUSCH resource wherein GT is not included
  PUSCH resource: CP+Payload Upon initiation of the Random Access procedure on a Serving Cell (310), after the selection of carrier (SUL or NUL) for performing Random Access procedure the MAC entity in UE shall for the selected carrier of this Serving Cell performs the following:

In an embodiment, if current active UL BWP is not initial UL BWP and 2 step RACH configuration is provided for the active UL BWP and event which triggered RA is allowed to use 2 step RACH (305), UE perform the following as illustrated in FIG. 3:
  if TAT timer is running (315):
    Transmit msgA on active UL BWP; Use UL timing for transmitting msgA PUSCH (320).
  if TAT timer is not running (315):
    If 2 step RACH config is provided for initial UL BWP (325):
      switch the active UL BWP to initial UL BWP (330);
      Transmit msgA on initial UL BWP (335);
      Use DL timing for transmitting msgA PUSCH
    Else if 4 step RACH config is provided for active UL BWP (340):
      Transmit msg1 on active UL BWP (355);
    Else if 4 step RACH config is not provided for active UL BWP (340):
      switch the active UL BWP to initial UL BWP (345);
      Transmit msg1 on initial UL BWP (350).

FIG. 4 illustrates a 2-step random access procedure according to another embodiment of the disclosure.

In an embodiment, if current active UL BWP is not initial UL BWP (410) and 2 step RACH configuration is provided for the active UL BWP (405), and event which triggered RA is allowed to use 2 step RACH as illustrated in FIG. 4:
  if TAT timer is running (415):
    Transmit msgA on active UL BWP (420);
    Use UL timing for transmitting msgA PUSCH
  if TAT timer is not running (415):
    if 4 step RACH config is provided for active UL BWP (425):
      Transmit msg1 on active UL BWP (430);
    Else if 4 step RACH config is not provided for active UL BWP (425):
      switch the active UL BWP to initial UL BWP (435);
      If 2 step RACH config is provided for initial UL BWP (440):
        Transmit msgA on initial UL BWP (450)
        Use DL timing for transmitting msgA PUSCH.
      Else (440),
        Transmit msg1 on initial UL BWP (450).

In an embodiment, if current active UL BWP is initial UL BWP and 2 step RACH configuration is provided for the active UL BWP and event which triggered RA is allowed to use 2 step RACH:
  if TAT timer is running:
    Transmit msgA on active UL BWP;
    Use UL timing for transmitting msgA PUSCH;
  if TAT timer is not running:
    Transmit msgA on active UL BWP;
    Use DL timing for transmitting msgA PUSCH In an alternate embodiment, if current active UL BWP is initial UL BWP and 2 step RACH configuration is provided for the active UL BWP and event which triggered RA is allowed to use 2 step RACH:
  Transmit msgA on active UL BWP;
  Use DL timing for transmitting msgA PUSCH In an alternate embodiment, for PUSCH transmission in PUSCH resource, UE determines whether PUSCH transmission is for MsgA of 2 step RA procedure or not. If PUSCH transmission is for MsgA of 2 step RA procedure, UE use DL timing for transmitting msgA PUSCH. If PUSCH transmission is not for MsgA of 2 step RA procedure and TAT timer is running, use UL timing (i.e. UE applies timing advanced) for transmitting msgA PUSCH.

Method 1-2:

In an embodiment, for 2 step RACH configuration gNB configures PUSCH resource with or without GT:
  PUSCH resource: CP+Payload+GT
  PUSCH resource: CP+Payload
  UE receives the 2 step RACH configuration from gNB in system information or dedicated RRC signaling. Upon initiation of random access procedure by an event for which it is allowed to use 2 step RACH, UE determines whether to use 2 step RACH or not as follows:
  If PUSCH resource without GT is configured for msgA:
    If TAT timer is running, UE performs 2 step RACH. Use UL timing for transmitting msgA PUSCH
    If TAT timer is not running, UE performs 4 step RACH.
  Else If PUSCH resource with GT is configured for msgA:
    UE performs 2 step RACH irrespective of whether TAT timer is running or not.
    If TAT timer is not running, use DL timing for transmitting msgA PUSCH. Otherwise use UL timing for transmitting msgA PUSCH.

Method 1-3:

In an embodiment, for 2 step RACH gNB configures multiple PUSCH resource pools, PUSCH resource pool 1 with GT and PUSCH resource pool 2 without GT.

Upon initiation of random access procedure by an event for which it is allowed to use 2 step RACH, UE determines whether to use 2 step RACH or not as follows:

If TAT timer is running, UE performs 2 step RACH using PUSCH resource pool 2. Use UL timing for transmitting msgA PUSCH If TAT timer is not running, UE performs 2 step RACH using PUSCH resource pool 1. Use DL timing for transmitting msgA PUSCH 2 Step RACH and BWP Switching In NR, if PRACH occasions are not configured in active UL BWP: UE switches active UL BWP to initial UL BWP; Msg1 and Msg3 are transmitted on initial UL BWP. Otherwise, Msg1 and Msg3 are transmitted on active UL BWP. When 2 step RACH is supported, an UL BWP can be configured with 2 step RACH configuration or 4 step RACH configuration or both or none as shown in Table 1. Current operation of only checking presence or absence of RACH occasions in an UL BWP is not efficient as in some cases UE cannot perform 2 step RACH even if it is supported by both UE and network. For example, if RACH configuration for 4 step RACH only is provided by network for active UL BWP and RACH configuration for both 4 step RACH and 2 step RACH is provided by network for initial UL BWP, UE performs 4 step RACH even if both UE and network supports 2 step RACH. Various methods to enhance the above procedure are described below.

FIG. 5 illustrates a 2-step random access procedure according to another embodiment of the disclosure.

Method 2-1:

In this method it is assumed that 2 step RACH can be used for any event which triggered random access procedure. In an embodiment of this method, the procedure for UL BWP switching is illustrated in FIG. 5.

Upon initiation of the Random Access procedure on a Serving Cell (505), after the selection of carrier (SUL or NUL) for performing Random Access procedure the MAC entity in UE shall for the selected carrier of this Serving Cell performs the following operation:

1> if PRACH occasions are configured for the active UL BWP (510):
  2> if UE supports 2 step RACH (520):
    3> if 2 step RACH configuration is not provided in active UL BWP and 2 step RACH configuration is provided for initial UL BWP (525, 530):
      4> switch the active UL BWP to BWP indicated by initialUplinkBWP (540);
      4> if the Serving Cell is a SpCell:
        5> switch the active DL BWP to BWP indicated by initialDownlinkBWP.
  2> else (520):
    3> if the Serving Cell is a SpCell:
      4> if the active DL BWP does not have the same bwp-Id as the active UL BWP:
        5> switch the active DL BWP to the DL BWP with the same bwp-Id as the active UL BWP (535).
1> else if PRACH occasions are not configured for the active UL BWP (510):
  2> switch the active UL BWP to BWP indicated by initialUplinkBWP (515);
  2> if the Serving Cell is an SpCell:
    3> switch the active DL BWP to BWP indicated by initialDownlinkBWP.
1> perform the Random Access procedure on the active DL BWP of SpCell and active UL BWP of this Serving Cell.

In an alternate embodiment, upon initiation of the Random Access procedure on a Serving Cell, after the selection of carrier for performing Random Access procedure the MAC entity in UE shall for the selected carrier of this Serving Cell performs the following operation:

1> if PRACH occasions are configured for the active UL BWP:
  2> if 2 step RACH configuration is not provided in active UL BWP and 2 step RACH configuration is provided for initial UL BWP:
    3> switch the active UL BWP to BWP indicated by initialUplinkBWP;
    3> if the Serving Cell is a SpCell:
      4> switch the active DL BWP to BWP indicated by initialDownlinkBWP.
  2> else:
    3> if the Serving Cell is a SpCell:
      4> if the active DL BWP does not have the same bwp-Id as the active UL BWP:
        5> switch the active DL BWP to the DL BWP with the same bwp-Id as the active UL BWP.
1> else if PRACH occasions are not configured for the active UL BWP:
  2> switch the active UL BWP to BWP indicated by initialUplinkBWP;
  2> if the Serving Cell is an SpCell:
    3> switch the active DL BWP to BWP indicated by initialDownlinkBWP.
1> perform the Random Access procedure on the active DL BWP of SpCell and active UL BWP of this Serving Cell.

In an embodiment, a RACH configuration is considered as 2 step RACH configuration if it includes PUSCH resources for msgA. RACH configuration is signaled by gNB in system information or dedicated RRC signaling.

Method 2-2: In one method of invention, 2 step CFRA is not supported for PDCCH order initiated random access, wherein PDCCH order for initiating random access is sent to UE by network. In this case we propose that if PDCCH order indicating CFRA resource is received by UE and the active UL BWP does not support 4 step RA (i.e. 4 step RACH configuration or RACH occasions are not configured), UE switches to initial UL BWP. The active UL BWP may be configured with 2 step RACH configuration.

Upon initiation of the Random Access procedure on a Serving Cell, after the selection of carrier (NUL or SUL) for performing Random Access procedure as specified in clause 5.1.1 of TS 38.321, the MAC entity shall for the selected carrier of this Serving Cell:

1> if random access procedure is initiated by PDCCH order and if the ra-PreambleIndex explicitly provided by PDCCH is not "0b000000" and if PRACH occasions for 4 step RA are not configured for the active UL BWP
  2> switch the active UL BWP to BWP indicated by initialUplinkBWP;
  2> if the Serving Cell is an SpCell:
    3> switch the active DL BWP to BWP indicated by initialDownlinkBWP.

1> else if PRACH occasions are not configured for the active UL BWP:
   2> switch the active UL BWP to BWP indicated by initialUplinkBWP;
   2> if the Serving Cell is an SpCell:
      3> switch the active DL BWP to BWP indicated by initialDownlinkBWP.
1> else:
   2> if the Serving Cell is an SpCell:
      3> if the active DL BWP does not have the same bwp-Id as the active UL BWP:
         4> switch the active DL BWP to the DL BWP with the same bwp-Id as the active UL BWP.

In another embodiment, upon initiation of the Random Access procedure on a Serving Cell, after the selection of carrier (NUL or SUL) for performing Random Access procedure as specified in clause 5.1.1 of TS 38.321, the MAC entity shall for the selected carrier of this Serving Cell:

1> if PRACH occasions are not configured for the active UL BWP; or
1> if random access procedure is initiated by PDCCH order and if the ra-PreambleIndex explicitly provided by PDCCH is not "0b000000" and if PRACH occasions for 4 step RA are not configured for the active UL BWP:
   2> switch the active UL BWP to BWP indicated by initialUplinkBWP;
   2> if the Serving Cell is an SpCell:
      3> switch the active DL BWP to BWP indicated by initialDownlinkBWP.
1> else:
   2> if the Serving Cell is an SpCell:
      3> if the active DL BWP does not have the same bwp-Id as the active UL BWP:
         4> switch the active DL BWP to the DL BWP with the same bwp-Id as the active UL BWP.

In an alternate embodiment, upon receiving a PDCCH order including ra-PreambleIndex where ra-PreambleIndex is not "0b000000", UE select whether to perform 4 step RA procedure or 2 step RA procedure as follows:

1> if UL BWP selected for RA procedure is configured with 4 step Random access resources:
   2> UE select 4 step RA. UE will perform contention free RA using preamble indicated by ra-PreambleIndex.
1> else
   2> UE select 2 step RA; UE will perform contention based RA.

In an alternate embodiment, upon initiation of the Random Access procedure (for an event for which both 2 step RA and 4 step RA can be used) on a Serving Cell, after the selection of carrier for performing Random Access procedure, the MAC entity shall for the selected carrier of this Serving Cell:

1> If active UL BWP is configured with only 2 step Random access resources and RSRP of the downlink pathloss reference is below a configured threshold (threshold is signaled by GNB):
   2> switch the active UL BWP to BWP indicated by initialUplinkBWP;
   2> if the Serving Cell is an SpCell:
      3> switch the active DL BWP to BWP indicated by initialDownlinkBWP.

In an alternate embodiment, upon initiation of the Random Access procedure (for an event for which both 2 step RA and 4 step RA can be used) on a Serving Cell, after the selection of carrier for performing Random Access procedure, the MAC entity shall for the selected carrier of this Serving Cell:

1> If active UL BWP is configured with only 4 step Random access resources and RSRP of the downlink pathloss reference is below a configured threshold (threshold is signaled by GNB) and BWP indicated by initialUplinkBWP is configured with 2 step Random access resources:
   2> switch the active UL BWP to BWP indicated by initialUplinkBWP;
   2> if the Serving Cell is an SpCell:
      3> switch the active DL BWP to BWP indicated by initialDownlinkBWP.

FIG. 6 illustrates a 2-step random access procedure according to another embodiment of the disclosure.

Method 2-3:

In this method it is assumed that selective events (predefined or indicated by gNB) amongst the event which triggered random access procedure can use 2 step RACH. In an embodiment of this method, the procedure for UL BWP switching is illustrated in FIG. 6.

Upon initiation of the Random Access procedure on a Serving Cell (605), after the selection of carrier for performing Random Access procedure the MAC entity in UE shall for the selected carrier of this Serving Cell performs the following operation:

1> if PRACH occasions are configured for the active UL BWP (610):
   2> if UE supports 2 step RACH (620):
      3> if 2 step RACH is allowed for event which initiated this Random Access procedure (630):
         4> if 2 step RACH configuration is not provided in active UL BWP and 2 step RACH configuration is provided for initial UL BWP (650, 660):
            5> switch the active UL BWP to BWP indicated by initialUplinkBWP (665);
            5> if the Serving Cell is a SpCell:
               6> switch the active DL BWP to BWP indicated by initialDownlinkBWP(655).
      3> else (i.e. if 2 step RACH is not allowed for event which initiated this Random Access procedure) (630):
         4> if 4 step RACH configuration is not provided in active UL BWP (635):
            5> switch the active UL BWP to BWP indicated by initialUplinkBWP (640);
            5> if the Serving Cell is a SpCell:
               6> switch the active DL BWP to BWP indicated by initialDownlinkBWP (645).
   2> else (620):
      3> if the Serving Cell is a SpCell:
         4> if the active DL BWP does not have the same bwp-Id as the active UL BWP:
            5> switch the active DL BWP to the DL BWP with the same bwp-Id as the active UL BWP (625).
1> else if PRACH occasions are not configured for the active UL BWP (610):
   2> switch the active UL BWP to BWP indicated by initialUplinkBWP (615);
   2> if the Serving Cell is an SpCell:
      3> switch the active DL BWP to BWP indicated by initialDownlinkBWP.
1> perform the Random Access procedure on the active DL BWP of SpCell and active UL BWP of this Serving Cell.

In an alternate embodiment, Upon initiation of the Random Access procedure on a Serving Cell, after the selection of carrier for performing Random Access procedure the MAC entity in UE shall for the selected carrier of this Serving Cell performs the following operation:
1> if PRACH occasions are configured for the active UL BWP:
  2> if 2 step RACH is allowed for event which initiated this Random Access procedure:
    3> if 2 step RACH configuration is not provided in active UL BWP and 2 step RACH configuration is provided for initial UL BWP:
      4> switch the active UL BWP to BWP indicated by initialUplinkBWP;
      4> if the Serving Cell is a SpCell:
        5> switch the active DL BWP to BWP indicated by initialDownlinkBWP.
  2> else (i.e. if 2 step RACH is not allowed for event which initiated this Random Access procedure):
    3> if 4 step RACH configuration is not provided in active UL BWP:
      4> switch the active UL BWP to BWP indicated by initialUplinkBWP;
      4> if the Serving Cell is a SpCell:
        5> switch the active DL BWP to BWP indicated by initialDownlinkBWP.
1> else if PRACH occasions are not configured for the active UL BWP:
  2> switch the active UL BWP to BWP indicated by initialUplinkBWP;
  2> if the Serving Cell is an SpCell:
    3> switch the active DL BWP to BWP indicated by initialDownlinkBWP.
1> perform the Random Access procedure on the active DL BWP of SpCell and active UL BWP of this Serving Cell.

In an alternate embodiment, Upon initiation of the Random Access procedure on a Serving Cell, after the selection of carrier for performing Random Access procedure the MAC entity in UE shall for the selected carrier of this Serving Cell performs the following operation:
1> If UE supports 2 step RACH and if 2 step RACH is allowed for event which initiated this Random Access procedure:
  2> if PRACH occasions are configured for the active UL BWP:
    3> if 2 step RACH configuration is not provided in active UL BWP and 2 step RACH configuration is provided for initial UL BWP:
      4> switch the active UL BWP to BWP indicated by initialUplinkBWP;
      4> if the Serving Cell is a SpCell:
        5> switch the active DL BWP to BWP indicated by initialDownlinkBWP.
    3> else:
      4> if the Serving Cell is a SpCell:
        5> if the active DL BWP does not have the same bwp-Id as the active UL BWP:
          6> switch the active DL BWP to the DL BWP with the same bwp-Id as the active UL BWP.
  2> else if PRACH occasions are not configured for the active UL BWP:
    3> switch the active UL BWP to BWP indicated by initialUplinkBWP;
    3> if the Serving Cell is a SpCell:
      4> switch the active DL BWP to BWP indicated by initialDownlinkBWP.
1> else:
  2> if PRACH occasions are not configured for the active UL BWP:
    3> switch the active UL BWP to BWP indicated by initialUplinkBWP;
    3> if the Serving Cell is a SpCell:
      4> switch the active DL BWP to BWP indicated by initialDownlinkBWP.
  2> else:
    3> if the Serving Cell is a SpCell:
      4> if the active DL BWP does not have the same bwp-Id as the active UL BWP:
        5> switch the active DL BWP to the DL BWP with the same bwp-Id as the active UL BWP.
1> perform the Random Access procedure on the active DL BWP of SpCell and active UL BWP of this Serving Cell.

FIG. 7 is a block diagram of a terminal according to an embodiment of the disclosure.

Referring to FIG. 7, a terminal includes a transceiver 710, a controller 720 and a memory 730. The controller 720 may refer to a circuitry, an application-specific integrated circuit (ASIC), or at least one processor. The transceiver 710, the controller 720 and the memory 730 are configured to perform the operations of the UE illustrated in the figures, e.g. FIGS. 1 to 6, or described above. Although the transceiver 710, the controller 720 and the memory 730 are shown as separate entities, they may be realized as a single entity like a single chip. Or, the transceiver 710, the controller 720 and the memory 730 may be electrically connected to or coupled with each other.

The transceiver 710 may transmit and receive signals to and from other network entities, e.g., a base station.

The controller 720 may control the UE to perform functions according to one of the embodiments described above. In an embodiment, the operations of the terminal may be implemented using the memory 730 storing corresponding program codes. Specifically, the terminal may be equipped with the memory 730 to store program codes implementing desired operations. To perform the desired operations, the controller 720 may read and execute the program codes stored in the memory 730 by using a processor or a central processing unit (CPU). Or, the controller 720 can be implemented as at least one processor.

FIG. 8 is a block diagram of a base station according to an embodiment of the disclosure.

Referring to FIG. 8, a base station includes a transceiver 810, a controller 820 and a memory 830. The transceiver 810, the controller 820 and the memory 830 are configured to perform the operations of the network (e.g., gNB) illustrated in the figures, e.g. FIGS. 1 to 6, or described above. Although the transceiver 810, the controller 820 and the memory 830 are shown as separate entities, they may be realized as a single entity like a single chip. The transceiver 810, the controller 820 and the memory 830 may be electrically connected to or coupled with each other.

The transceiver 810 may transmit and receive signals to and from other network entities, e.g., a terminal. The controller 820 may control the base station to perform functions according to one of the embodiments described above. The controller 820 may refer to a circuitry, an ASIC, or at least one processor. In an embodiment, the operations of the base station may be implemented using the memory 830 storing corresponding program codes. Specifically, the base station may be equipped with the memory 830 to store program codes implementing desired operations. To perform the desired operations, the controller 820 may read and execute the program codes stored in the memory 830 by using a processor or a CPU. Or, the controller 820 can be implemented as at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

The invention claimed is:

1. A method performed by a terminal in a wireless communication system, the method comprising:
   identifying whether an active uplink bandwidth part (BWP) is configured with a physical random access channel (PRACH) occasion, upon triggering of a random access procedure on a serving cell;
   identifying whether the active uplink BWP is configured with a 2-step random access channel (RACH) configuration, in case that active uplink BWP is configured with the PRACH occasion and the terminal supports a 2-step random access procedure;
   switching to an initial uplink BWP, in case that the active uplink BWP is not configured with the 2-step RACH configuration; and
   performing the 2-step random access procedure in the initial uplink BWP.

2. The method of claim 1, further comprising switching to an initial downlink BWP, in case that the serving cell is a special cell (SpCell), and
   wherein the 2-step random access procedure is performed in the initial uplink BWP and the initial downlink BWP.

3. The method of claim 1, wherein the active uplink BWP is switched to the initial uplink BWP, in case that the initial uplink BWP is configured with 2-step RACH configuration, or the active uplink BWP is not configured with the PRACH occasion.

4. The method of claim 1, wherein the 2-step RACH configuration includes a first physical uplink shared channel (PUSCH) resource pool and a second PUSCH resource pool,
   wherein the first PUSCH resource pool is for a payload with a guard time (GT) and the second PUSCH resource pool is for a payload without a GT, and
   wherein the 2-step random access procedure is performed in the active uplink BWP, in case that the active uplink BWP is configured with the 2-step RACH configuration and a time alignment timer (TAT) is running.

5. A method performed by a base station in a wireless communication system, the method comprising:
   transmitting, to a terminal, information configuring a physical random access channel (PRACH) occasion; and
   transmitting, to the terminal, information configuring a 2-step random access configuration,
   wherein whether an active uplink bandwidth part (BWP) is configured with a PRACH occasion is identified by the terminal, upon triggering of a random access procedure on a serving cell,
   wherein whether the active uplink BWP is configured with a 2-step RACH configuration is identified by the terminal, in case that active uplink BWP is configured with the PRACH occasion and the terminal supports a 2-step random access procedure,
   wherein the active uplink BWP is switched to an initial uplink BWP by the terminal, in case that the active uplink BWP is not configured with the 2-step RACH configuration, and
   wherein the 2-step random access procedure is performed by the terminal in the initial uplink BWP.

6. The method of claim 5, wherein an active downlink BWP is switched to an initial downlink BWP, in case that the serving cell is a special cell (SpCell),
   wherein the 2-step random access procedure is performed in the initial uplink BWP and the initial downlink BWP, and
   wherein the active uplink BWP is switched to the initial uplink BWP, in case that the initial uplink BWP is configured with 2-step RACH configuration, or the active uplink BWP is not configured with the PRACH occasion.

7. The method of claim 5, wherein the 2-step RACH configuration includes a first physical uplink shared channel (PUSCH) resource pool and a second PUSCH resource pool,
   wherein the first PUSCH resource pool is for a payload with a guard time (GT) and the second PUSCH resource pool is for a payload without a GT, and
   wherein the 2-step random access procedure is performed in the active uplink BWP, in case that the active uplink BWP is configured with the 2-step RACH configuration and a time alignment timer (TAT) is running.

8. A terminal in a wireless communication system, the terminal comprising:
   a transceiver configured to transmit and receive a signal; and
   a controller configured to:
   identify whether an active uplink bandwidth part (BWP) is configured with a physical random access channel (PRACH) occasion, upon triggering of a random access procedure on a serving cell,
   identify whether the active uplink BWP is configured with a 2-step random access channel (RACH) configuration, in case that active uplink BWP is configured with the PRACH occasion and the terminal supports a 2-step random access procedure,
   switch to an initial uplink BWP, in case that the active uplink BWP is not configured with the 2-step RACH configuration, and
   perform the 2-step random access procedure in the initial uplink BWP.

9. The terminal of claim 8, wherein the controller is further configured to switch to an initial downlink BWP, in case that the serving cell is a special cell (SpCell), and
   wherein the 2-step random access procedure is performed in the initial uplink BWP and the initial downlink BWP.

10. The terminal of claim 8, wherein the active uplink BWP is switched to the initial uplink BWP, in case that the initial uplink BWP is configured with 2-step RACH configuration, or the active uplink BWP is not configured with the PRACH occasion.

11. The terminal of claim 8, wherein the 2-step RACH configuration includes a first physical uplink shared channel (PUSCH) resource pool and a second PUSCH resource pool,
    wherein the first PUSCH resource pool is for a payload with a guard time (GT) and the second PUSCH resource pool is for a payload without a GT, and
    wherein the 2-step random access procedure is performed in the active uplink BWP, in case that the active uplink BWP is configured with the 2-step RACH configuration and a time alignment timer (TAT) is running.

12. A base station in a wireless communication system, the base station comprising:
a transceiver configured to transmit and receive a signal; and
a controller configured to:
transmit, to a terminal, information configuring a physical random access channel (PRACH) occasion, and
transmit, to the terminal, information configuring a 2-step random access configuration,
wherein whether an active uplink bandwidth part (BWP) is configured with a PRACH occasion is identified by the terminal, upon triggering of a random access procedure on a serving cell,
wherein whether the active uplink BWP is configured with a 2-step RACH configuration is identified by the terminal, in case that active uplink BWP is configured with the PRACH occasion and the terminal supports a 2-step random access procedure,
wherein the active uplink BWP is switched to an initial uplink BWP by the terminal, in case that the active uplink BWP is not configured with the 2-step RACH configuration, and wherein the 2-step random access procedure is performed by the terminal in the initial uplink BWP.

13. The base station of claim 12, wherein an active downlink BWP is switched to an initial downlink BWP, in case that the serving cell is a special cell (SpCell), and
wherein the 2-step random access procedure is performed in the initial uplink BWP and the initial downlink BWP.

14. The base station of claim 12, wherein the active uplink BWP is switched to the initial uplink BWP, in case that the initial uplink BWP is configured with 2-step RACH configuration, or the active uplink BWP is not configured with the PRACH occasion.

15. The base station of claim 12, wherein the 2-step RACH configuration includes a first physical uplink shared channel (PUSCH) resource pool and a second PUSCH resource pool,
wherein the first PUSCH resource pool is for a payload with a guard time (GT) and the second PUSCH resource pool is for a payload without a GT, and
wherein the 2-step random access procedure is performed in the active uplink BWP, in case that the active uplink BWP is configured with the 2-step RACH configuration and a time alignment timer (TAT) is running.

* * * * *